(12) United States Patent
Balfour, Jr.

(10) Patent No.: US 10,895,708 B2
(45) Date of Patent: Jan. 19, 2021

(54) LOCATABLE DUCT TRACER WIRE BONDING CONNECTOR

(71) Applicant: Electric Motion Company, Inc., Winsted, CT (US)

(72) Inventor: William J. Balfour, Jr., Torrington, CT (US)

(73) Assignee: ELECTRIC MOTION COMPANY, INC., Winsted, CT (US)

( * ) Notice: Subject to any disclaimer, the term of this patent is extended or adjusted under 35 U.S.C. 154(b) by 0 days.

(21) Appl. No.: 15/747,655

(22) PCT Filed: Aug. 3, 2016

(86) PCT No.: PCT/US2016/045243
§ 371 (c)(1),
(2) Date: Jan. 25, 2018

(87) PCT Pub. No.: WO2017/023969
PCT Pub. Date: Feb. 9, 2017

(65) Prior Publication Data
US 2018/0217345 A1 Aug. 2, 2018

Related U.S. Application Data

(60) Provisional application No. 62/201,164, filed on Aug. 5, 2015.

(51) Int. Cl.
*H01R 4/24* (2018.01)
*G02B 6/44* (2006.01)
(Continued)

(52) U.S. Cl.
CPC .......... *G02B 6/447* (2013.01); *G02B 6/4439* (2013.01); *H01R 4/2408* (2013.01); *H01R 4/34* (2013.01); *H01R 4/66* (2013.01); *H01R 11/12* (2013.01)

(58) Field of Classification Search
CPC .......... H01R 4/2408; H01R 4/34; H01R 4/66; H01R 11/22; G02B 6/44; G02B 6/4495; G02B 6/4401; G02B 6/447; G02B 6/4439
(Continued)

(56) References Cited

U.S. PATENT DOCUMENTS 1,173,099 A * 2/1916 Davis ................... H01H 33/002
200/572
1,910,022 A   5/1933 Legg
(Continued)

OTHER PUBLICATIONS

Search Report and Written Opinion.

*Primary Examiner* — Edwin A. Leon
*Assistant Examiner* — Milagros Jeancharles
(74) *Attorney, Agent, or Firm* — Wissing Miller LLP (57) ABSTRACT

A connector is employed for bonding a locatable tracer wire with a lead wire. A base has a first receiving slot and an axial slot which intersects the receiving slot. A contact plate is slidably receivable in the axial slot and is dimensioned to accommodate a tracer wire and an insulator cover received in the receiving slot at a first axial position and to sever the cover and conductively engage the tracer at a second axial position. A fastener threadably engages the base. Upon tightening the fastener to the base, a shoulder extending from the contact plate is displaced and ultimately stopped so that the plate is disposed at the second position. The lead wire is also secured by the fastener.

6 Claims, 7 Drawing Sheets

(51) Int. Cl.
*H01R 4/66* (2006.01)
*H01R 4/2408* (2018.01)
*H01R 4/34* (2006.01)
*H01R 11/12* (2006.01)

(58) Field of Classification Search
USPC ....... 439/92, 94, 97, 101, 11–116, 386, 387, 439/389, 391, 395, 396, 398, 400, 411, 439/426, 427, 428, 443, 873, 877–889
See application file for complete search history.

(56) References Cited

U.S. PATENT DOCUMENTS

| | | | | |
|---|---|---|---|---|
| 2,514,474 A * | 7/1950 | Brown Cook | ......... | H01R 11/15 29/874 |
| 2,555,099 A * | 5/1951 | Thomas | ................ | H01R 11/15 439/815 |
| 2,934,737 A * | 4/1960 | Gibson | ................ | H01R 4/2408 439/412 |
| 2,958,067 A * | 10/1960 | Hardy | ................ | C09K 8/58 439/479 |
| 3,075,166 A * | 1/1963 | Peek | ................ | H01R 11/15 439/479 |
| 3,132,914 A * | 5/1964 | Wengen | ................ | H01R 11/15 439/479 |
| 3,218,602 A * | 11/1965 | Milton | ................ | H01R 4/2479 439/412 |
| 3,258,733 A * | 6/1966 | Elm | ................ | H01R 4/2454 439/400 |
| 3,380,014 A * | 4/1968 | Schenker | ............. | H01R 4/2408 439/412 |
| 3,629,804 A * | 12/1971 | Behymer | ............. | H01R 4/2408 439/411 |
| 3,895,852 A * | 7/1975 | Wasserlein, Jr. | ...... | H01R 4/2462 439/398 |
| 3,960,428 A | 6/1976 | Naus et al. | | |
| 4,039,239 A * | 8/1977 | Cobaugh | .............. | H01R 4/2445 439/398 |
| 4,080,034 A * | 3/1978 | Werner | ................ | H01R 4/2408 439/413 |
| 4,116,522 A * | 9/1978 | Reynolds | ............. | H01R 4/2462 439/398 |
| 4,597,623 A * | 7/1986 | Krumreich | ........... | H01R 4/2454 439/404 |
| 4,701,001 A * | 10/1987 | Verhoeven | ............. | H01R 9/053 439/394 |
| 5,011,428 A * | 4/1991 | Heng | ................ | H01R 9/032 439/394 |
| 5,041,012 A * | 8/1991 | Caprio | ................ | H01R 4/2408 439/409 |
| 5,302,144 A * | 4/1994 | Francois | ............... | H01R 4/2408 439/271 |
| 5,557,250 A * | 9/1996 | Debbaut | .................. | H01C 7/12 337/18 |
| 5,636,306 A * | 6/1997 | Mock | ................... | G02B 6/4416 385/100 |
| 5,674,079 A * | 10/1997 | Auclair | .................. | H01R 4/363 439/812 |
| 6,045,414 A * | 4/2000 | DeFrance | ................ | H01R 4/42 439/790 |
| 6,086,406 A * | 7/2000 | Francois | ............... | H01R 4/2408 439/402 |
| 6,264,492 B1 * | 7/2001 | LaLaouna | ............ | H01R 4/2408 439/402 |
| 6,591,055 B1 | 7/2003 | Eslambolchi et al. | | |
| 6,604,956 B2 * | 8/2003 | Ruiz | .................... | H01R 4/2454 439/402 |
| 6,877,996 B1 * | 4/2005 | Franks, Jr. | ............... | H01R 4/42 439/782 |
| 7,104,832 B2 * | 9/2006 | Campbell | .............. | H01R 4/363 439/411 |
| 7,127,871 B2 * | 10/2006 | Putz | ........................ | B65B 63/04 53/117 |
| 7,131,856 B2 * | 11/2006 | Hoisington | .......... | H01R 4/2408 439/411 |
| 7,198,495 B1 * | 4/2007 | Youtsey | ................ | H01R 4/646 439/97 |
| 7,326,069 B1 * | 2/2008 | Duesterhoeft | ....... | H01R 4/2433 439/395 |
| 7,611,363 B2 * | 11/2009 | Nakamura | ............... | H01R 4/48 439/108 |
| 7,862,390 B2 * | 1/2011 | Copper | ................ | H01R 4/5091 439/781 |
| 8,025,521 B2 * | 9/2011 | Diniz | .................... | H01R 11/07 439/395 |
| 8,651,891 B2 * | 2/2014 | Balfour | ................ | H01R 4/489 439/479 |
| 9,065,191 B2 * | 6/2015 | Martin | ................... | H01R 11/26 |
| 9,196,978 B2 * | 11/2015 | Magno | ................... | H01R 4/36 |
| 9,444,159 B2 * | 9/2016 | Lappoehn | ............ | H01R 12/515 |
| 9,812,794 B2 * | 11/2017 | Cawood | ................ | H01R 4/42 |
| 9,887,469 B1 * | 2/2018 | King, Jr. | ............... | H01R 4/2454 |
| 10,074,916 B2 * | 9/2018 | Hanson | ................ | H01R 9/0503 |
| 10,164,356 B2 * | 12/2018 | Diop | ........................ | H01R 4/12 |
| 2002/0176674 A1 | 11/2002 | Auclair | | |
| 2012/0219259 A1 | 8/2012 | Kewitsch | | |
| 2014/0167763 A1 * | 6/2014 | Giraldi | ................... | H01R 4/643 324/326 |
| 2014/0191845 A1 * | 7/2014 | Grimsley | ................ | F16L 1/11 340/8.1 |
| 2014/0227438 A1 | 8/2014 | Dean, Jr. et al. | | |

\* cited by examiner

LOCATABLE DUCT TRACER WIRE BONDING CONNECTOR

BACKGROUND

This disclosure relates generally to tracer wires which extend along communication cables for locating same. More particularly, this disclosure relates to connectors which are employed for bonding the tracer wires to a ground wire.

In communication systems which employ optical fibers, the optical cables are typically buried underground and connect with handholes or vaults which are underground or at least partially submerged below ground level. It is important that once the optical cables are placed below the level of the ground, the optical cables can be located for repair, replacement, maintenance and other reasons. Typically, a tracer wire is disposed longitudinally along the outer surface of the cable cover to locate the cable. Ground wires which conductively communicate with the tracer wires of the cables are typically joined at a locate wire terminal within the vault.

SUMMARY

Briefly stated, a locatable tracer wire bonding connector comprises a base having a first surface and an axially spaced second surface. The base has a transverse receiving slot. The base also has an axial slot intersecting the receiving slot. A contact plate is slidably receivable in the axial slot. The contact plate has a shoulder with an opening. The contact plate is dimensioned to accommodate a tracer wire and insulator cover received in the receiving slot at a first axial position. The contact plate severs the cover and conductively engages the tracer wire at a second axial position. A fastener extends through the opening and threadably engages the base. Upon tightening the fastener to the base, the shoulder is displaced and ultimately stopped by the first surface and the plate is stably disposed at the second position.

The contact plate has a convergent edge. A cable with a tracer wire is received in the receiving slot and conductively engaged by the contact plate. The base has a surface generally complementary with the cable exterior portion and in general contact therewith. A lead wire is secured by the fastener. The contact plate has a bend to form the shoulder and has a generally L-shaped section.

A locatable tracer wire bonding connector comprises a base with a first surface, an axially spaced second surface and a transverse receiving slot. The base also has an axial slot intersecting the receiving slot. A generally L-shaped member comprises a contact plate slidably receivable in the axial slot and having a shoulder. The contact plate is configured to accommodate a tracer wire and insulator cover received in the receiving slot at a first axial position. The contact plate is dimensioned to sever the covering and conductively engage the tracer wire in a second axial position. A fastener is threadably engageable with the base. Upon tightening the fastener, the shoulder is displaced and ultimately stopped by the first surface, and the plate is stably disposed at the second position.

The base has a stepped concave surface generally complementary with the cable exterior and in general contact with the cable exterior.

A locatable tracer wire bonding connector comprises a base having a first surface and an axially spaced second surface and a transverse generally concave surface traversed by a channel-like receiving slot. The base also has an axial slot intersecting the receiving slot. A contact plate is slidably receivable and displaceable in the axial slot and has a shoulder defining an opening. The contact plate is dimensioned to accommodate a tracer wire and insulator cover received in the receiving slot at a first axial position. The contact plate is configured to sever the cover and conductively engage and capture the tracer wire at a second axial position. A fastener extends through the opening and threadably engages the base. Upon tightening the fastener, the shoulder is displaced and to a position wherein the plate is stably disposed at the second position.

The base has a front and the contact plate has a convergent edge disposed inwardly from the front. A cable has a tracer wire where received in the receiving slot and conductively engaged by the contact plate. The cable has a rounded exterior portion, and the concave surface is generally complementary and in general contact with the cable exterior portion.

DETAILED DESCRIPTION

With reference to the drawings wherein like numerals represent like parts throughout, a bonding connector is generally designated by the numeral 10. The bonding connector functions to connect the tracer wire with a ground wire to provide a connector for a wire which connects to the locate wire terminal at the handhole or vault for ultimate grounding. In this regard, the bonding connector functions as part of a locate wire management system for the various optical fiber cables within a local network.

The bonding connector 10 functions to attach to the exterior cover 12 of the optical cable 14 and to receive a portion of the tracer wire 16, including its insulated cover 17 integrated with cover 12. Upon proper installation of the bonding connector, a connection of high mechanical and electrical integrity between the tracer wire 16 conductor and a ground wire 18 is obtained so that a lead wire from the connector can be efficiently connected to the locate wire terminal (not illustrated) to provide high quality communication with the tracer wire. A suitable locate wire connector is described in U.S. Pat. No. 7,462,061.

The bonding connector 10 comprises a base 20 which may be of molded, cast or other construction. The base 20 has opposed parallel first and second sides 22 and 24 with an intermediate front side 26. The front side 26 has a stepped concave-like contour 28 which generally complements the exterior rounded surface of the optical cable 14.

A transverse channel-like slot 30 extends across side 26 of the base and is dimensioned to amply accommodate the generally radial projecting tracer wire 16 (and its cover 17). A thin lateral axial slot 32 traverses the base from the first side 22 to the second side 24 and intersects the transverse slot 30 and portions of the contoured surface 28.

Figure 3:
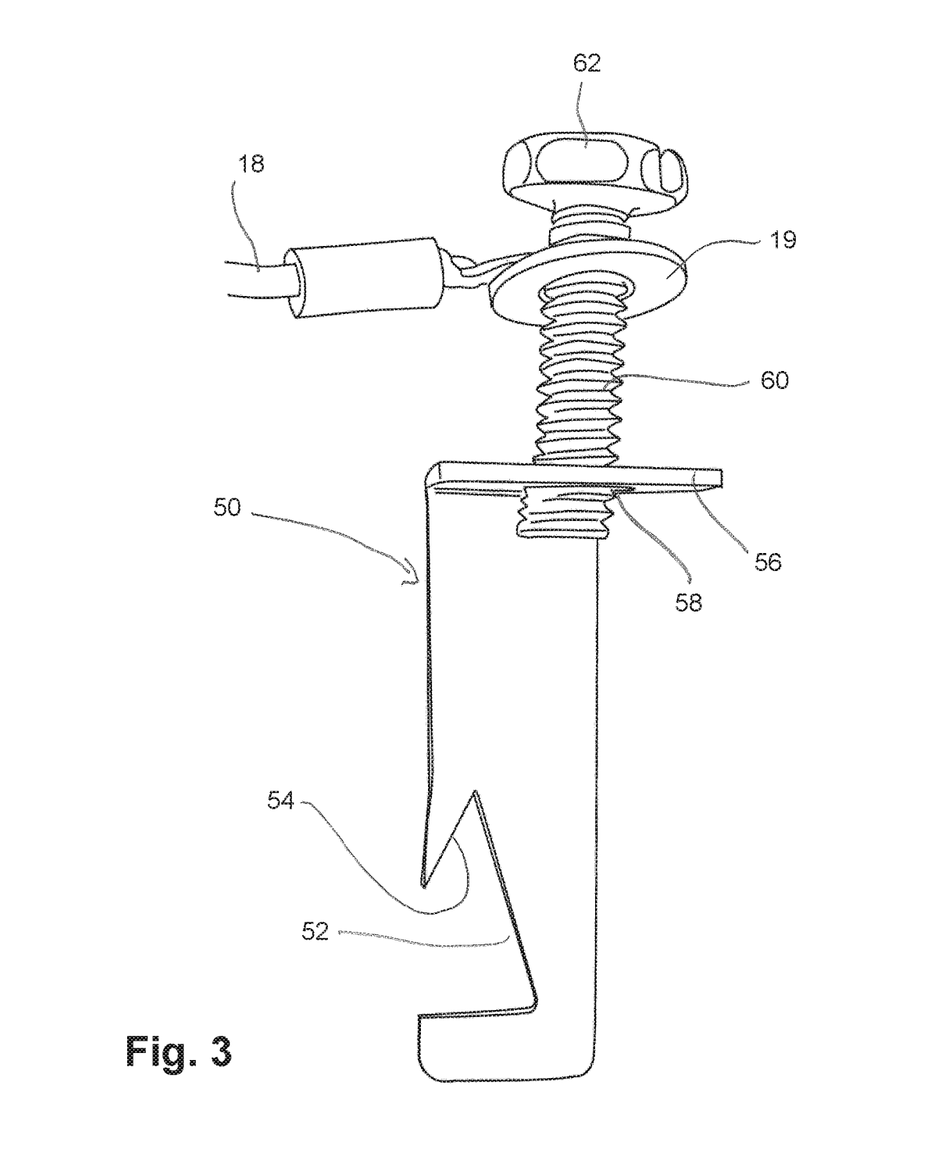
FIG. 3 is a side perspective view of a portion of the bonding connector and the ground wire of FIG. 2.
Figure 4:
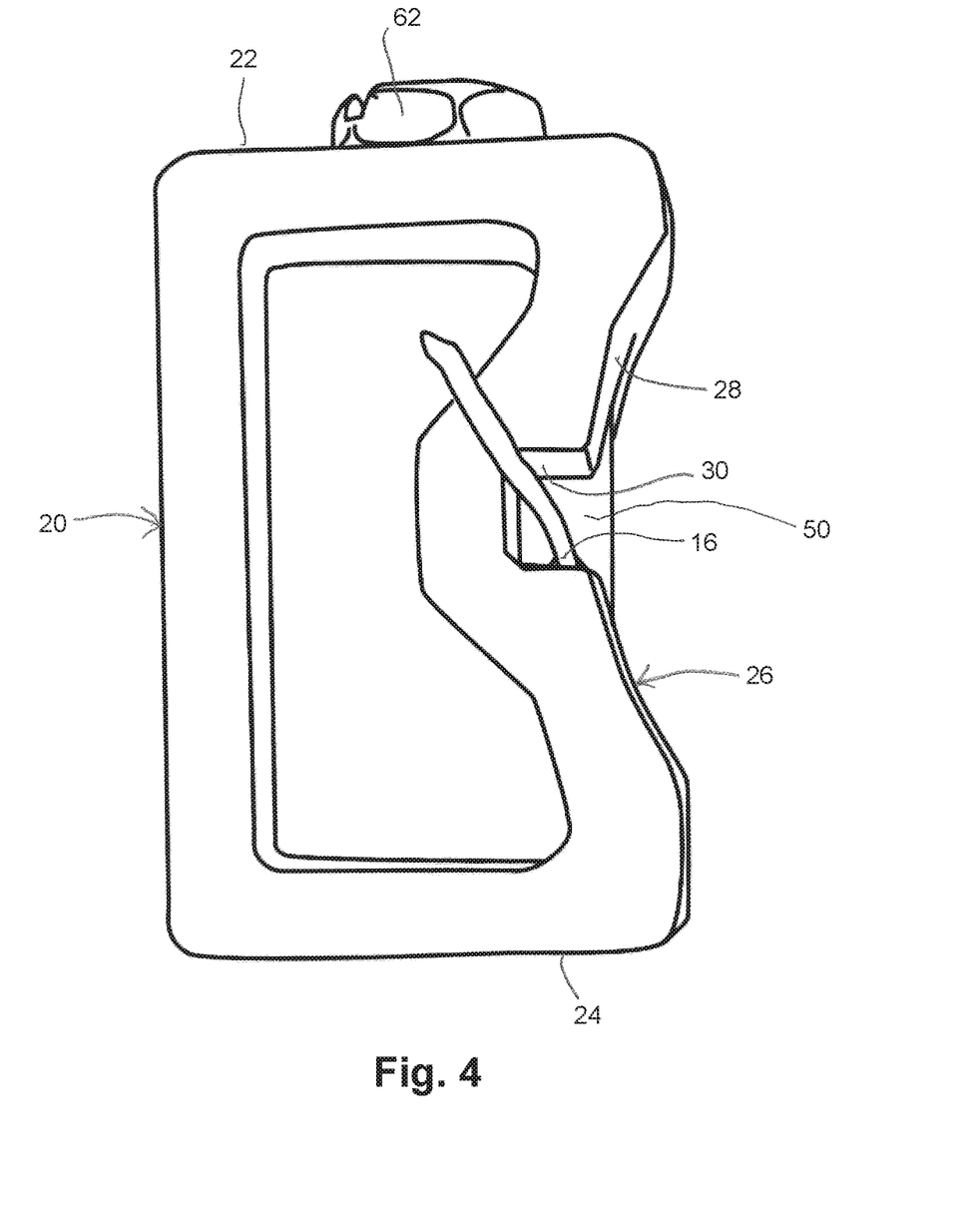
FIG. 4 is a side elevational view of the bonding connector of FIG. 2, portions removed, illustrating an installed engaged position thereof for certain components.

With additional reference to FIG. 3, a plate 50 of copper or conductive metal is slidably received in the slot 32. The plate 50 has a special geometry which defines a recess 52 for receiving the tracer wire 16 and its cover 17 in a first axial position. In a second axial position, the plate has an upper convergent edge 54 configured to engage over the tracer wire 16 and cover 17 to sever the outer cover 17 of the tracer wire 16 and to capture and engage the tracer wire 16 in a trapped condition in the transverse slot 30 to thereby provide a conductive communication with the plate 50. The plate further integrally bends to form a transverse shoulder 56 and thus defines an L-shaped section. Shoulder 56 has an opening 58. Upon axial displacement of the plate 50, the shoulder 56 is adapted to abut against or be stopped by the first surface 22 to thereby define the second axial position.

Figure 7:
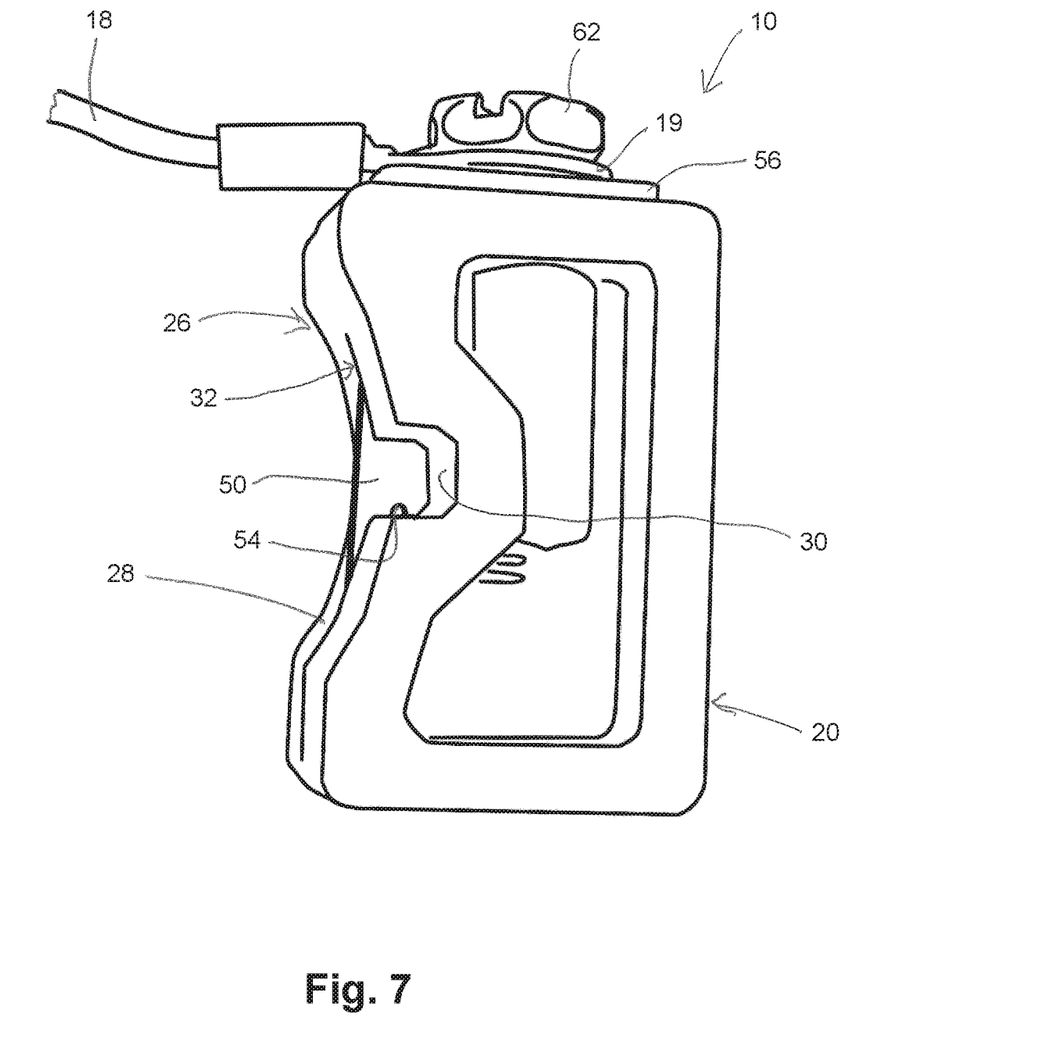
FIG. 7 is a generally side perspective view of the bonding connector and the ground wire illustrating an installed position of the connector without the fiber optic cable and tracer wire.

The base 20 also includes an axial threaded bore 34 which threadably engages with a set screw 60. The set screw 60 may have a hex head 62 or otherwise be configured to be torqued. The set screw 60 extends through a terminal 19 of the ground wire 18 and, in some instances, a washer (not illustrated) and threads into the threaded bore 34. When the threaded set screw 60 is tightened, the shoulder 56 engages or is stopped by the surface 22, and the plate 50 is correspondingly displaced to the second axial position severing the tracer wire cover 17 to establish electrical communication with the tracer wire 16. The engagement of the shoulder against surface 22 (or a washer 66) limits the displacement of the plate so that the tracer wire 16 is engaged by convergent edge 54 in cooperation with the walls of the transverse slot 30, but not severed. The second axial position is stable due to the tightened set screw 60 (See FIG. 7). The ground wire 18 may then be connected to the locate terminal within the vault (neither illustrated).

Figure 1:
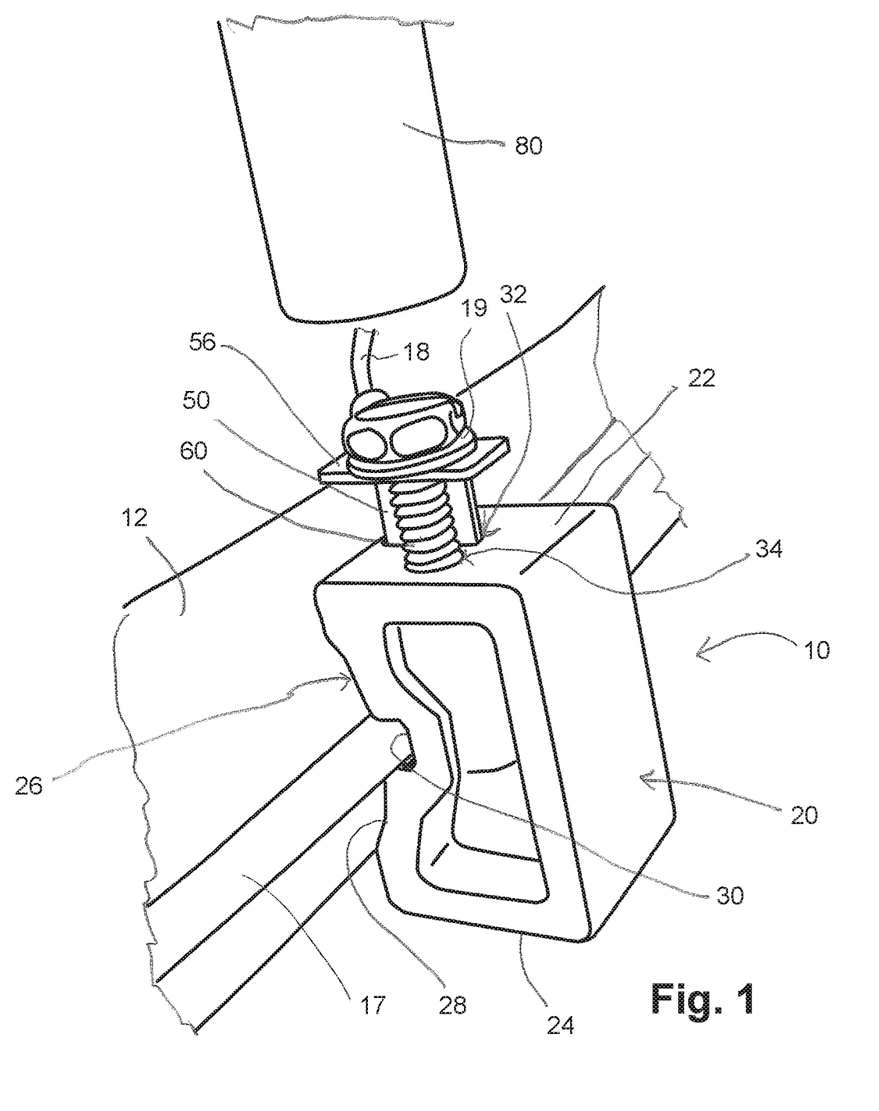
FIG. 1 is a generally side perspective view of a locatable duct tracer wire bonding connector in a pre-installed condition in conjunction with a portion of a fiber optic cable and tracer wire and an installation tool (partially illustrated)
Figure 2:
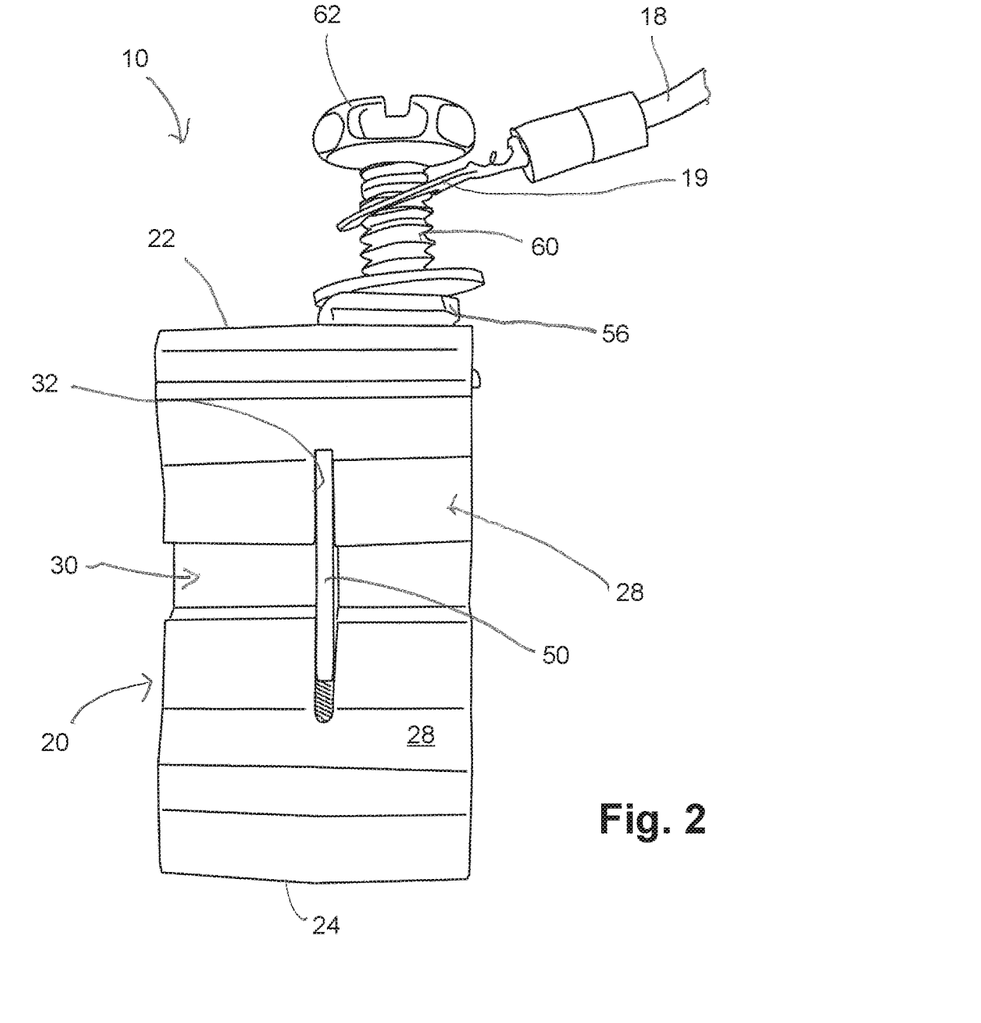
FIG. 2 is a frontal perspective view of the bonding connector of FIG. 1 together with a ground wire (partially illustrated)
Figure 5:
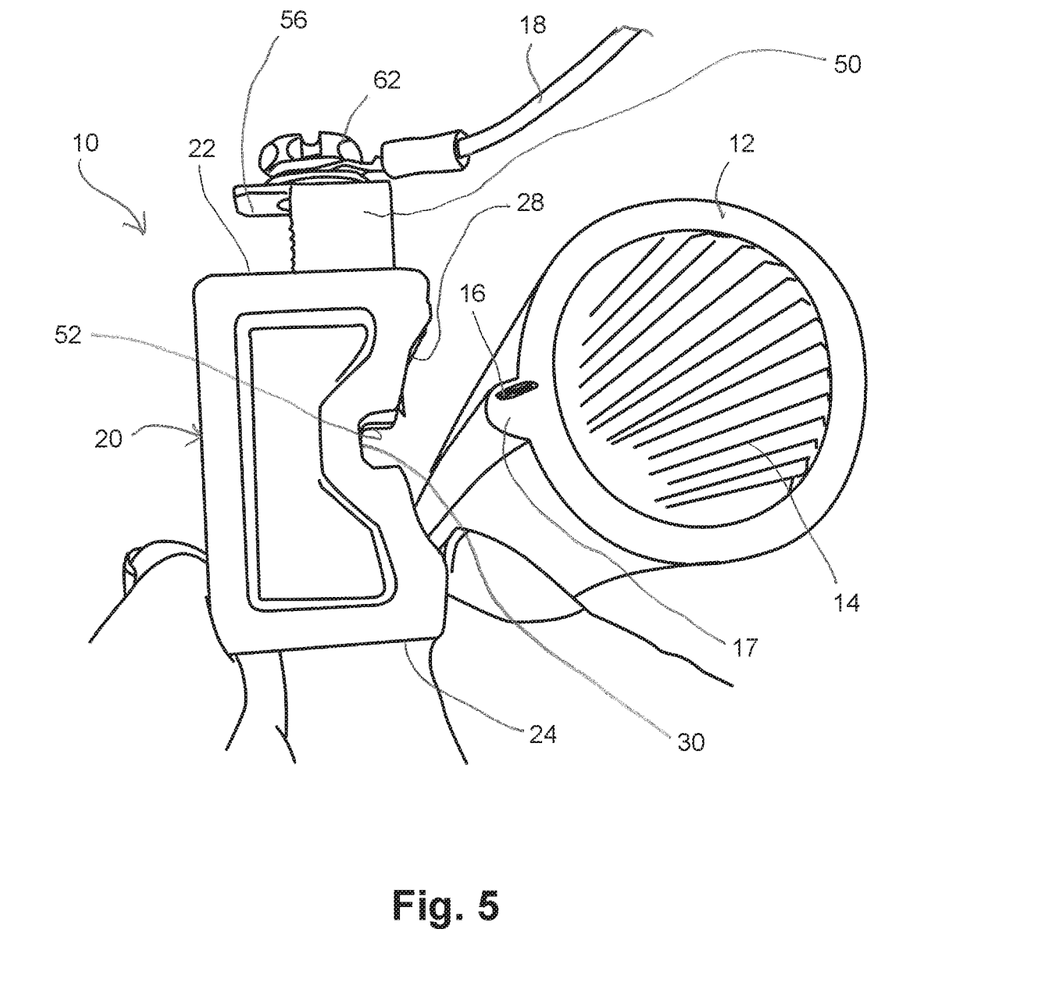
FIG. 5 is a generally side perspective view of the bonding connector and locate wire portion of FIG. 1 and a portion of a fiber optic cable with a tracer wire together with hand portions of an installation further illustrating a step in the installation of the bonding connector.
Figure 6:
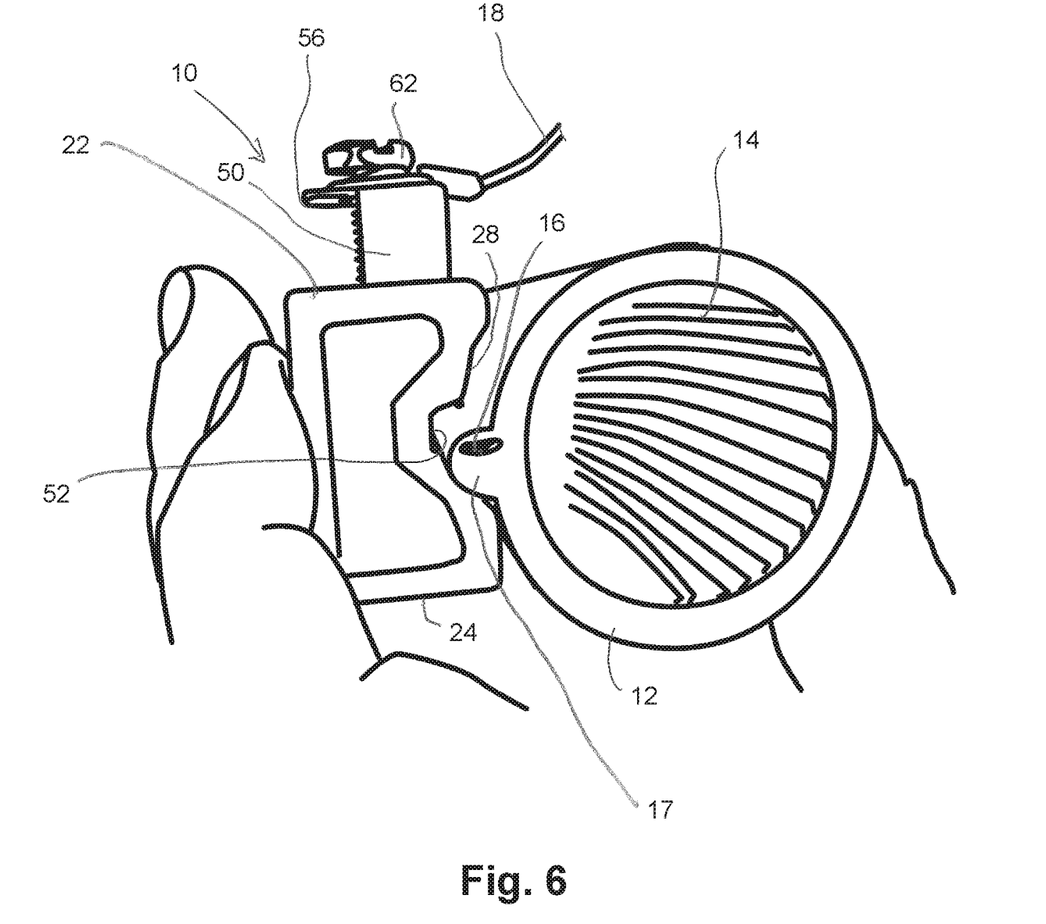
FIG. 6 is a generally side perspective view of the bonding connector of the fiber optic cable portion, the tracer wire portion and the ground wire portion together with hand portions of an installer illustrating a subsequent installation step of the bonding connector.

With reference to FIGS. 5 and 6 and then FIG. 1, the connector may be easily and efficiently installed on the optical cable by placing the base side 26 against the cable with the tracer wire 16 and cover being received in the receiving slot 30. The set screw 60, which has captured the terminal end 19 of the ground wire 18, is then tightened or torqued toward the first side 22 by a socket of an installation tool 80 until the shoulder 56 engages or is stopped by the first side 22, and the plate edge 54 is displaced to provide the proper electrical contact with the tracer wire. The base 20 contacts the cover 12 to also maintain attachment of the connector 10 against the optical cable 14 to provide an electrical connection of high integrity between the tracer wire 16 and the locate terminal upon connecting the ground wire to the terminal.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A locatable tracer wire bonding connector comprising:
   a base having a first side, a second side spaced from the first side, a front side extending between the first side and the second side, and a transverse receiving slot in an outer surface of the front side, the base having a plate receiving slot extending from the first side toward the second side and intersecting the transverse receiving slot;
   a contact plate positioned within the plate receiving slot and having a shoulder with an opening, the contact plate being movable within the plate receiving slot between a first position and a second position, the contact plate being configured to accommodate a tracer wire and insulator cover received in the transverse receiving slot when in the first position and to sever the cover and conductively engage and capture the tracer wire when in the second position; and
   a fastener extending through the opening and threadably engageable with the first side, wherein upon tightening the fastener to the first side, the shoulder is displaced to a fixed position at which the plate is in the second position.

2. The bonding connector of claim 1, and further comprising a cable with a tracer wire which is received in the receiving slot and conductively engaged by the contact plate.

3. The bonding connector of claim 2, wherein the cable has a rounded exterior portion and the concave outer surface is generally complementary with the cable exterior portion and in general contact therewith.

4. The bonding connector of claim 1, and further comprising a lead wire secured by the fastener.

5. A locatable tracer wire bonding connector comprising:
   a base having a first side, a second side spaced from the first side, a front side between the first side and the second side, wherein an outer surface of the front side has a transverse receiving slot, the base having a slot extending from the first side toward the second side and intersecting the receiving slot;
   an electrically conductive contact plate positioned within the slot and movable between a first position and a second position, the contact plate having a shoulder, the contact plate being configured to accommodate a tracer wire and insulator cover received in the receiving slot when the contact plate is in the first position and to sever the cover and conductively engage the tracer wire when the contact plate is in the second position;
   a fastener threadably engageable with the base wherein upon tightening the fastener to the first side, the shoulder is stopped and the plate is disposed at the second position.

6. The locatable tracer wire bonding connector of claim 1, wherein the concave surface is a stepped surface.

* * * * *